(12) United States Patent
Zeng et al.

(10) Patent No.: US 10,555,007 B2
(45) Date of Patent: Feb. 4, 2020

(54) DEBLOCKING FILTERING METHOD AND DEBLOCKING FILTER

(71) Applicant: Huawei Technologies Co., Ltd., Shenzhen (CN)

(72) Inventors: Bing Zeng, Chengdu (CN); Zexiang Miao, Chengdu (CN); Chen Chen, Chengdu (CN); Shuyuan Zhu, Chengdu (CN); Yin Zhao, Hangzhou (CN); Haitao Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 135 days.

(21) Appl. No.: 15/837,594

(22) Filed: Dec. 11, 2017

(65) Prior Publication Data
US 2018/0103274 A1    Apr. 12, 2018

Related U.S. Application Data

(63) Continuation of application No. PCT/CN2016/075311, filed on Mar. 2, 2016.

(30) Foreign Application Priority Data

Jun. 11, 2015    (CN) .......................... 2015 1 0320826

(51) Int. Cl.
*H04N 19/86*   (2014.01)
*H04N 19/117*   (2014.01)
(Continued)

(52) U.S. Cl.
CPC ........... *H04N 19/86* (2014.11); *H04N 19/117* (2014.11); *H04N 19/137* (2014.11); *H04N 19/176* (2014.11)

(58) Field of Classification Search
CPC .... H04N 19/86; H04N 19/102; H04N 19/117; H04N 19/137; H04N 19/176; H04N 19/82
(Continued)

(56) References Cited

U.S. PATENT DOCUMENTS 5,852,682 A    12/1998 Kim
8,526,509 B2    9/2013 Norkin et al.
(Continued)

FOREIGN PATENT DOCUMENTS

CN    1134091 A    10/1996
CN    102754441 A    10/2012
(Continued)

OTHER PUBLICATIONS

Norkin et al., "HEVC Deblocking Filter," IEEE Transactions on Circuits and Systems for Video Technology, vol. 22, No. 12, XP011487156, pp. 1746-1754, Institute of Electrical and Electronics Engineers, New York, New York (Dec. 2012).
(Continued)

*Primary Examiner* — Patricia I Young
(74) *Attorney, Agent, or Firm* — Leydig, Voit & Mayer, Ltd.

(57) ABSTRACT

A deblocking filtering method and a deblocking filter are provided. The method includes: determining, according to a current pixel value of a to-be-filtered pixel in a picture block and pixel values of pixels in a first neighbouring partition of the to-be-filtered pixel, a first filtering offset value of the to-be-filtered pixel; performing prediction on the pixel value of the to-be-filtered pixel according to pixel values of pixels in a second neighbouring partition of the to-be-filtered pixel to obtain a prediction value of filtered value of the to-be-filtered pixel; and determining an actual filtered value of the to-be-filtered pixel according to the current pixel value, the first filtering offset value, and the prediction value of filtered value.

17 Claims, 4 Drawing Sheets

First picture block | Second picture block

(51) Int. Cl.
*H04N 19/137* (2014.01)
*H04N 19/176* (2014.01)

(58) Field of Classification Search
USPC .................................................. 375/240.29
See application file for complete search history.

(56) References Cited

U.S. PATENT DOCUMENTS

| | | |
|---|---|---|
| 2012/0229636 A1 | 9/2012 | Ogawa et al. |
| 2013/0077697 A1 | 3/2013 | Chen et al. |
| 2013/0114675 A1* | 5/2013 | Guo ................. H04N 19/13 375/240.02 |
| 2014/0192892 A1 | 7/2014 | Van Der Auwera et al. |
| 2015/0215652 A1 | 7/2015 | Lu et al. |

FOREIGN PATENT DOCUMENTS

| | | |
|---|---|---|
| CN | 103051890 A | 4/2013 |
| CN | 104219520 A | 12/2014 |
| CN | 104641649 A | 5/2015 |
| KR | 0174452 B1 | 3/1999 |
| WO | 2014110240 A1 | 7/2014 |

OTHER PUBLICATIONS

Narroschke et al., "Deblocking filter using adaptive weighting factors," Joint Collaborative Team on Video Coding (JCT-VC) of ITU-T SG16 WP3 and ISO/IEC JTC1/SC29/WG11, Document: JCTVC-F405, pp. 1-9, 6th Meeting: Torino, IT, International Telecommunications Union, Geneva, Switzerland (Jul. 14-22, 2011).

"Series H: Audiovisual and Multimedia Systems, Infrastructure of Audiovisual Services—Coding of Moving Video, Advanced Video Coding for Generic Audiovisual Services," Recommendation ITU-T H.264, pp. i-768, International Telecommunications Union, Geneva, Switzerland (Feb. 2014).

Series H: Audiovisual and Multimedia Systems Infrastructure of audiovisual services—Coding of moving video, High efficiency video coding, Recommendation ITU-T H.265, pp. i-612, International Telecommunications Union, Geneva, Switzerland (Apr. 2015).

Norkin et al., "CE1: Reduction of block artifacts in HEVC," JCT-VC of ITU-T SG 16 WP 3 and ISO/IEC JTC 1/SC 29/WG 11, Docoment JCTVC-K0186, 11th Meeting, Shanghai, China, pp. 1-33, (Oct. 10-19, 2012).

* cited by examiner

DEBLOCKING FILTERING METHOD AND DEBLOCKING FILTER

CROSS-REFERENCE TO RELATED APPLICATIONS

This application is a continuation of International Application No. PCT/CN2016/075311, filed on Mar. 2, 2016, which claims priority to Chinese Patent Application No. 201510320826.0, filed on Jun. 11, 2015. The disclosures of the aforementioned applications are hereby incorporated by reference in their entireties.

TECHNICAL FIELD

Embodiments of the present disclosure relate to the communications field, and more, to a deblocking filtering method and a deblocking filter.

BACKGROUND

A hybrid coding framework, for example, a video coding standard such as H.264/AVC, H.265/HEVC, or AVS, is usually used for video coding. The hybrid coding framework mainly includes steps of prediction, transform, quantization, entropy coding, loop deblocking filtering, and the like.

For example, a high efficiency video coding (HEVC) standard uses a block-based hybrid coding framework with prediction and transform. In HEVC, a to-be-coded video may be divided into an I-frame, a P-frame, and a B-frame. Coding of the I-frame is intra-frame coding. Coding of the P-frame and the B-frame is inter-frame coding. There are block-based coding modes for both inter-frame coding and intra-frame coding. In HEVC, a picture is divided into blocks by using coding tree units (CTUs) as basic units. A CTU is further divided into coding units (CUs) in a form of a quadtree. During prediction and transform, a CU is used as a root node and further divided into prediction units (PUs) and transform units (TUs).

Block-based transform coding is widely applied in picture compression coding. As a bit rate is reduced, quantization becomes coarse, discontinuity occurs at boundaries of blocks, and obvious defects are formed in a reconstructed picture. This phenomenon of discontinuity between picture blocks is referred to as a blocking artifact.

In conventional deblocking, a deblocking filter is usually used. The deblocking filter may first compute a filtering offset value of a pixel located at a boundary of a block, and filter a pixel value of the pixel according to the filtering offset value. However, in a signal filtered according to this method, a local waveform gradient may increase. Consequently, a location of a maximum waveform gradient may change, and overall smoothness of the signal is reduced.

SUMMARY

Embodiments of the present disclosure provide a deblocking filtering method and a deblocking filter to improve overall waveform smoothness of a filtered signal.

According to a first aspect, a deblocking filtering method is provided and includes: determining, according to a current pixel value of a to-be-filtered pixel in a picture block and pixel values of pixels in a first neighbouring partition of the to-be-filtered pixel, a first filtering offset value of the to-be-filtered pixel; performing prediction on the pixel value of the to-be-filtered pixel according to pixel values of pixels in a second neighbouring partition of the to-be-filtered pixel to obtain a prediction value of a filtered value of the to-be-filtered pixel; and determining an actual filtered value of the to-be-filtered pixel according to the current pixel value, the first filtering offset value, and the prediction value of a filtered value.

With reference to the first aspect, in an implementation of the first aspect, the determining an actual filtered value of the to-be-filtered pixel according to the current pixel value, the first filtering offset value, and the prediction value of a filtered value includes: computing an absolute value of a difference obtained by subtracting a sum of the prediction value of a filtered value and the current pixel value from the first filtering offset value, to obtain a first absolute value, computing an absolute value of a difference obtained by subtracting the prediction value of a filtered value from the current pixel value, to obtain a second absolute value, and comparing the first absolute value with the second absolute value; and determining the actual filtered value according to a comparison result.

With reference to the first aspect or the foregoing implementation of the first aspect, in another implementation of the first aspect, the determining the actual filtered value according to a comparison result includes: when the first absolute value is greater than the second absolute value, using a value obtained by adding a second filtering offset value $\Delta_2$ to the current pixel value, as the actual filtered value, where $\Delta_2 = \delta\Delta_1$, $\Delta_1$ indicates the first filtering offset value, and $-1<\delta<1$; or when the first absolute value is less than or equal to the second absolute value, using a value obtained by adding the first filtering offset value to the current pixel value, as the actual filtered value.

With reference to the first aspect or the foregoing implementation of the first aspect, in another implementation of the first aspect, the determining the actual filtered value according to the current pixel value, the first filtering offset value, and the prediction value of a filtered value includes: determining whether a sign of a difference obtained by subtracting the prediction value of a filtered value from the current pixel value is the same as a sign of the first filtering offset value; and determining the actual filtered value according to a determining result.

With reference to the first aspect or the foregoing implementation of the first aspect, in another implementation of the first aspect, the determining the actual filtered value according to a determining result includes: when the sign of the difference obtained by subtracting the prediction value of a filtered value from the current pixel value is the same as the sign of the first filtering offset value $\Delta_1$, determining a value obtained by adding a second filtering offset value $\Delta_2$ to the current pixel value, as the actual filtered value, where $\Delta_2 = \delta\Delta_1$, A indicates the first filtering offset value, and $-1<\delta<1$; or when the sign of the difference obtained by subtracting the prediction value of a filtered value from the current pixel value is opposite to the sign of the first filtering offset value $\Delta_1$, using a value obtained by adding the first filtering offset value to the current pixel value, as the actual filtered value.

With reference to the first aspect or the foregoing implementation of the first aspect, in another implementation of the first aspect, the performing prediction on the pixel value of the to-be-filtered pixel according to pixel values of pixels in a second neighbouring partition of the to-be-filtered pixel to obtain a prediction value of a filtered value of the to-be-filtered pixel includes: performing weighted summation on pixel values of at least two pixels that are in the second neighbouring partition and located on two sides of the to-be-filtered pixel, to obtain the prediction value of a filtered value of the to-be-filtered pixel.

With reference to the first aspect or the foregoing implementation of the first aspect, in another implementation of the first aspect, the performing weighted summation on pixel values of at least two pixels that are in the second neighbouring partition and located on two sides of the to-be-filtered pixel, to obtain the prediction value of a filtered value of the to-be-filtered pixel includes: determining the prediction value of a filtered value according to the following formula: $r=\text{round}[(d_1 p_1+d_2 p_2+\ldots+d_N p_N)/d_{N+1}]$, where $d_1, d_2, \ldots, d_N$, and $d_{N+1}$ are preset parameters, $d_{N+1}=d_1+d_2+\ldots+d_N$, $p_1, p_2, \ldots, p_N$ are N pixel values respectively corresponding to N pixels that are in the second neighbouring partition and located on the two sides of the to-be-filtered pixel, and N is an integer greater than or equal to 2.

With reference to the first aspect or the foregoing implementation of the first aspect, in another implementation of the first aspect, the performing prediction on the pixel value of the to-be-filtered pixel according to pixel values of pixels in a second neighbouring partition of the to-be-filtered pixel to obtain a prediction value of a filtered value of the to-be-filtered pixel includes: determining a fitted curve, where the fitted curve includes fitted parameters; fitting at least two pixels in the second neighbouring partition according to the fitted curve to obtain values of the fitted parameters; and obtaining the prediction value of a filtered value of the to-be-filtered pixel according to the values of the fitted parameters and the fitted curve.

With reference to the first aspect or the foregoing implementation of the first aspect, in another implementation of the first aspect, the fitted curve is:

$$S(t) = \frac{1}{1+e^{-\partial t}} \times \beta + \gamma,$$

where t is a distance from the to-be-filtered pixel to a boundary of the picture block, and $\partial$, $\beta$, and $\gamma$ are the fitted parameters; and correspondingly, the fitting at least two pixels in the second neighbouring partition according to the fitted curve to obtain values of the fitted parameters includes: determining values of $\partial$, $\beta$, and $\gamma$ according to the fitted curve, distances from at least three pixels that are in the second neighbouring partition and located on two sides of the to-be-filtered pixel to the boundary of the picture block, and pixel values corresponding to the at least three pixels.

With reference to the first aspect or the foregoing implementation of the first aspect, in another implementation of the first aspect, the fitted curve is:

$$S(t) = \frac{t}{\sqrt{1+t^2}} \times \beta + \gamma,$$

where t is a distance from the to-be-filtered pixel to a boundary of the picture block, and $\beta$ and $\gamma$ are the fitted parameters; and correspondingly, the fitting at least two pixels in the second neighbouring partition according to the fitted curve to obtain values of the fitted parameters includes: determining values of $\beta$ and $\gamma$ according to the fitted curve, distances from at least two pixels that are in the second neighbouring partition and located on two sides of the to-be-filtered pixel to the boundary of the picture block, and pixel values corresponding to the at least two pixels.

With reference to the first aspect or the foregoing implementation of the first aspect, in another implementation of the first aspect, the fitted curve is: $S(t)=\tan h(\partial t) \times \beta + \gamma$, where t is a distance from the to-be-filtered pixel to a boundary of the picture block, and $\partial$, $\beta$, and $\gamma$ are the fitted parameters; and correspondingly, the fitting at least two pixels in the second neighbouring partition according to the fitted curve to obtain values of the fitted parameters includes: determining values of $\partial$, $\beta$, and $\gamma$ according to the fitted curve, distances from at least two pixels that are in the second neighbouring partition and located on two sides of the to-be-filtered pixel to the boundary of the picture block, and pixel values corresponding to the at least two pixels.

With reference to the first aspect or the foregoing implementation of the first aspect, in another implementation of the first aspect, the determining, according to a current pixel value of a to-be-filtered pixel and pixel values of pixels in a first neighbouring partition of the to-be-filtered pixel, a first filtering offset value of the to-be-filtered pixel includes: performing weighted summation on the current pixel value of the to-be-filtered pixel and a pixel value of at least one pixel in the first neighbouring partition to obtain the filtering offset value of the to-be-filtered pixel.

With reference to the first aspect or the foregoing implementation of the first aspect, in another implementation of the first aspect, the first neighbouring partition and the second neighbouring partition are the same.

According to a second aspect, a deblocking filter is provided and includes: a first determining unit, configured to determine, according to a current pixel value of a to-be-filtered pixel in a picture block and pixel values of pixels in a first neighbouring partition of the to-be-filtered pixel, a first filtering offset value of the to-be-filtered pixel; a predicting unit, configured to perform prediction on the pixel value of the to-be-filtered pixel according to pixel values of pixels in a second neighbouring partition of the to-be-filtered pixel to obtain a prediction value of a filtered value of the to-be-filtered pixel; and a second determining unit, configured to determine an actual filtered value of the to-be-filtered pixel according to the current pixel value, the first filtering offset value obtained by the first determining unit, and the prediction value of a filtered value obtained by the predicting unit.

With reference to the second aspect, in an implementation of the second aspect, the second determining unit is configured to: compute an absolute value of a difference obtained by subtracting a sum of the prediction value of a filtered value and the current pixel value from the first filtering offset value, to obtain a first absolute value; compute an absolute value of a difference obtained by subtracting the prediction value of a filtered value from the current pixel value, to obtain a second absolute value; compare the first absolute value with the second absolute value; and determine the actual filtered value according to a comparison result.

With reference to the second aspect or the foregoing implementation of the second aspect, in another implementation of the second aspect, the second determining unit is configured to: when the first absolute value is greater than the second absolute value, use a value obtained by adding a second filtering offset value $\Delta_2$ to the current pixel value, as the actual filtered value, where $\Delta_2=\delta\Delta_1$, $\Delta_1$ indicates the first filtering offset value, and $-1<\delta<1$; or when the first absolute value is less than or equal to the second absolute value, use a value obtained by adding the first filtering offset value to the current pixel value, as the actual filtered value.

With reference to the second aspect or the foregoing implementation of the second aspect, in another implementation of the second aspect, the second determining unit is configured to: determine whether a sign of a difference obtained by subtracting the prediction value of a filtered value from the current pixel value is the same as a sign of the first filtering offset value; and determine the actual filtered value according to a determining result.

With reference to the second aspect or the foregoing implementation of the second aspect, in another implementation of the second aspect, the second determining unit is configured to: when the sign of the difference obtained by subtracting the prediction value of a filtered value from the current pixel value is the same as the sign of the first filtering offset value $\Delta_1$, use a value obtained by adding a second filtering offset value $\Delta_2$ to the current pixel value, as the actual filtered value, where $\Delta_2 = \delta \Delta_1$, $\Delta_1$ indicates the first filtering offset value, and $-1 < \delta < 1$; or when the sign of the difference obtained by subtracting the prediction value of a filtered value from the current pixel value is opposite to the sign of the first filtering offset value $\Delta_1$, use a value obtained by adding the first filtering offset value to the current pixel value, as the actual filtered value.

With reference to the second aspect or the foregoing implementation of the second aspect, in another implementation of the second aspect, the predicting unit is configured to perform weighted summation on pixel values of at least two pixels that are in the second neighbouring partition and located on two sides of the to-be-filtered pixel, to obtain the prediction value of a filtered value of the to-be-filtered pixel.

With reference to the second aspect or the foregoing implementation of the second aspect, in another implementation of the second aspect, the predicting unit is configured to determine the prediction value of a filtered value according to the following formula: $r = \text{round}[(d_1 p_1 + d_2 p_2 + \ldots + d_N p_N)/d_{N+1}]$, where $d_1, d_2, \ldots d_N$, and $d_{N+1}$ are preset parameters, $d_{N+1} = d_1 + d_2 + \ldots + d_N$, $p_1, p_2, \ldots, p_N$ are N pixel values respectively corresponding to N pixels that are in the second neighbouring partition and located on the two sides of the to-be-filtered pixel, and N is an integer greater than or equal to 2.

With reference to the second aspect or the foregoing implementation of the second aspect, in another implementation of the second aspect, the predicting unit is configured to: determine a fitted curve, where the fitted curve includes fitted parameters; fit at least two pixels in the second neighbouring partition according to the fitted curve to obtain values of the fitted parameters; and obtain the prediction value of a filtered value of the to-be-filtered pixel according to the values of the fitted parameters and the fitted curve.

With reference to the second aspect or the foregoing implementation of the second aspect, in another implementation of the second aspect, the fitted curve is:

$$S(t) = \frac{1}{1+e^{-\partial t}} \times \beta + \gamma,$$

where t is a distance from the to-be-filtered pixel to a boundary of the picture block, and $\partial$, $\beta$, and $\gamma$ are the fitted parameters; and correspondingly, the predicting unit is configured to determine values of $\partial$, $\beta$, and $\gamma$ according to the fitted curve, distances from at least three pixels that are in the second neighbouring partition and located on two sides of the to-be-filtered pixel to the boundary of the picture block, and pixel values corresponding to the at least three pixels.

With reference to the second aspect or the foregoing implementation of the second aspect, in another implementation of the second aspect, the fitted curve is:

$$S(t) = \frac{t}{\sqrt{1+t^2}} \times \beta + \gamma,$$

where t is a distance from the to-be-filtered pixel to a boundary of the picture block, and $\beta$ and $\gamma$ are the fitted parameters; and correspondingly, the predicting unit is configured to determine values of $\beta$ and $\gamma$ according to the fitted curve, distances from at least two pixels that are in the second neighbouring partition and located on two sides of the to-be-filtered pixel to the boundary of the picture block, and pixel values corresponding to the at least two pixels.

With reference to the second aspect or the foregoing implementation of the second aspect, in another implementation of the second aspect, the fitted curve is: $S(t) = \tan h(\partial t) \times \beta + \gamma$, where t is a distance from the to-be-filtered pixel to a boundary of the picture block, and $\alpha$, $\beta$, and $\gamma$ are the fitted parameters; and correspondingly, the predicting unit is configured to determine values of $\alpha$, $\beta$, and $\gamma$ according to the fitted curve, distances from at least two pixels that are in the second neighbouring partition and located on two sides of the to-be-filtered pixel to the boundary of the picture block, and pixel values corresponding to the at least two pixels.

With reference to the second aspect or the foregoing implementation of the second aspect, in another implementation of the second aspect, the first determining unit is configured to perform weighted summation on the current pixel value of the to-be-filtered pixel and a pixel value of at least one pixel in the first neighbouring partition to obtain the filtering offset value of the to-be-filtered pixel.

With reference to the second aspect or the foregoing implementation of the second aspect, in another implementation of the second aspect, the first neighbouring partition and the second neighbouring partition are the same.

In the embodiments of the present disclosure, the filtering offset value and prediction value of a filtered value of the to-be-filtered pixel are determined by using the pixel values of the neighbouring pixels of the to-be-filtered pixel, and the actual filtered value is determined according to the filtering offset value, the current pixel value, and the prediction value of a filtered value. In this way, overall waveform smoothness of a filtered signal can be improved.

BRIEF DESCRIPTION OF DRAWINGS

To describe the technical solutions in the embodiments of the present disclosure more clearly, the following briefly describes the accompanying drawings for describing the embodiments of the present disclosure. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure.

Figure 1:
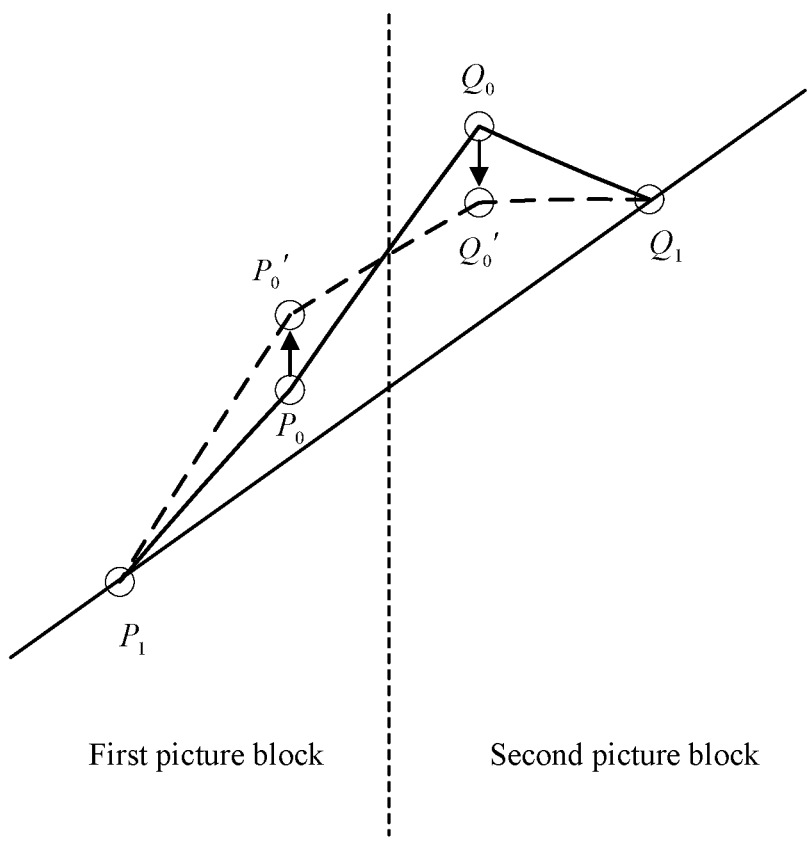
FIG. 1 is a schematic diagram of a filtering exception caused by a conventional deblocking filtering method.

FIG. 1 is a schematic diagram of a filtering exception caused by a conventional deblocking filtering method.

A deblocking filter in FIG. 1 may be a deblocking filter in HEVC. Pixels $P_0$ and $P_1$ are located in a first picture block of a picture, and pixels $Q_0$ and $Q_1$ are located in a second picture block of the picture.

In conventional deblocking, a deblocking filter is generally used. The deblocking filter may first compute a filtering offset value of a pixel located at a boundary of a block, and filter a pixel value of the pixel according to the filtering offset value. For example, after pixels $P_0$ and $Q_0$ are filtered, pixels $P_0'$ and $Q_0'$ are obtained. However, as can be seen from the picture, after the filtering, a gradient between $P_0'$ and $Q_0'$ decreases, and a gradient between $Q_0'$ and $Q_1$ also decreases, that is, a gradient between pixels $P_0'$ and $Q_1$ decreases. Therefore, a blocking artifact does not occur easily in this waveform segment. However, a gradient between $P_1$ and $P_0'$ increases. From an entire waveform between $P_0$ and $P_1$, a maximum gradient after the filtering does not decrease, but a location of the maximum gradient changes from area between $P_0$ and $Q_0$ to area between $P_1$ and $P_0'$. That is, in a filtered signal, a local waveform gradient may increase. Consequently, the location of the maximum waveform gradient changes, overall smoothness of the signal is reduced, a subjective visual effect is impaired, and coding efficiency is reduced.

Figure 2:
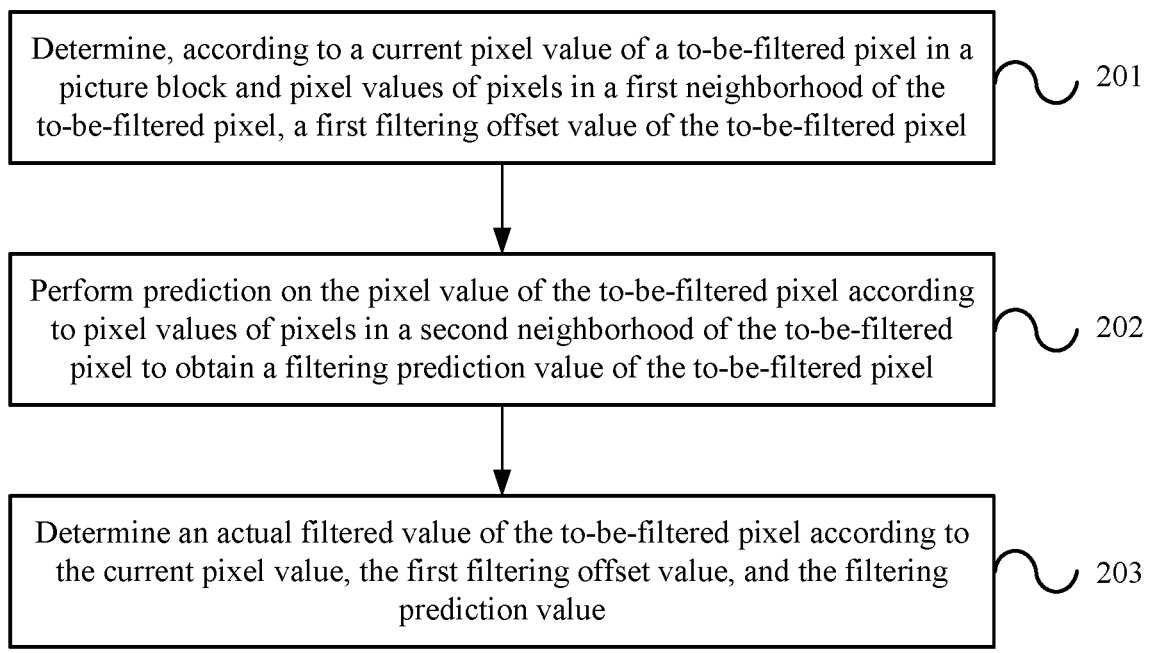
FIG. 2 is a schematic flowchart of a deblocking filtering method according to an embodiment of the present disclosure.

FIG. 2 is a schematic flowchart of a deblocking filtering method according to an embodiment of the present disclosure. The method in FIG. 2 may be performed by a deblocking filter.

201. Determine, according to a current pixel value of a to-be-filtered pixel in a picture block and pixel values of pixels in a first neighbouring partition of the to-be-filtered pixel, a first filtering offset value of the to-be-filtered pixel.

202. Perform prediction on the pixel value of the to-be-filtered pixel according to pixel values of pixels in a second neighbouring partition of the to-be-filtered pixel to obtain a prediction value of a filtered value of the to-be-filtered pixel.

203. Determine an actual filtered value of the to-be-filtered pixel according to the current pixel value, the first filtering offset value, and the prediction value of a filtered value.

In this embodiment of the present disclosure, the filtering offset value and prediction value of a filtered value of the to-be-filtered pixel are determined by using the pixel values of the neighbouring pixels of the to-be-filtered pixel, and the actual filtered value is determined according to the filtering offset value, the current pixel value, and the prediction value of a filtered value. In this way, overall waveform smoothness of a filtered signal can be improved.

The to-be-filtered pixel in this embodiment of the present disclosure may be a pixel located at a boundary of each picture block such as a coding block, a transform block, or a prediction block, or may be a pixel located at a boundary of only a picture block that has a blocking artifact. This is not limited in this embodiment of the present disclosure.

A specific location of the to-be-filtered pixel is not limited in this embodiment of the present disclosure. In an embodiment of the present disclosure, a filter may perform, according to the foregoing method, filtering processing on at least one to-be-filtered pixel in a blocking artifact. Each to-be-filtered pixel may be any pixel in a region that has a blocking artifact in a coding block, a transform block, or a prediction block. Generally, the to-be-filtered pixel may be a pixel located at a boundary of a block that has a blocking artifact.

In addition, multiple to-be-filtered pixels may be pixels in a row or a column crossing two coding blocks, or may be pixels in a row or a column crossing two transform blocks, or may be pixels in a row or a column crossing two prediction blocks. When filtering processing is performed on the multiple to-be-filtered pixels, and filtering offset values and prediction value of filtered values of the multiple to-be-filtered pixels are computed, a same computing method may be used, or different computing methods may be used. In this embodiment of the present disclosure, filtering processing is performed on a to-be-filtered pixel in a region that has a blocking artifact. However, how many to-be-filtered pixels are selected is not limited in this embodiment of the present disclosure. For example, a quantity of multiple to-be-filtered pixels may be 4, 6, 8, 10, 12, or 9. Generally, at least a pixel located at a boundary of a block that has a blocking artifact is selected. The following uses any one of the multiple to-be-filtered pixels as an example for description.

In an embodiment of the present disclosure, the first filtering offset value $\Delta_1$ of the to-be-filtered pixel may be determined according to the current pixel value of the to-be-filtered pixel and the pixel values of the pixels in the first neighbouring partition of the to-be-filtered pixel. The pixels in the first neighbouring partition of the to-be-filtered pixel may be pixels in a region neighbouring to the to-be-filtered pixel. A size of the first neighbouring partition is not limited in this embodiment of the present disclosure, as long as the first neighbouring partition includes other pixels than the to-be-filtered pixel. In other words, the filtering offset value of the to-be-filtered pixel may be obtained according to the current pixel value of the to-be-filtered pixel and a pixel value of at least one pixel neighbouring to the to-be-filtered pixel.

Optionally, weighted summation may be performed on the current pixel value of the to-be-filtered pixel and a pixel value of at least one pixel in the first neighbouring partition to obtain the filtering offset value of the to-be-filtered pixel.

A method for computing a filtering offset value of a pixel in HEVC may be used to compute the filtering offset value of the to-be-filtered pixel. For example, a first filtering offset value of a to-be-filtered pixel $P_0$ may be determined according to the following formula:

$$\Delta_1 = \text{round}\{[a(q_0-p_0)-b(q_1-p_1)]/c\} \quad (1)$$

where a, b, and c are preset constants, $P_0$ is a pixel value of the to-be-filtered pixel, and $p_1$, $q_0$, and $q_1$ are pixel values corresponding to three pixels in the first neighbouring partition.

Pixels $P_1$, $Q_0$, and $Q_1$ are pixels in the first neighbouring partition of the pixel $P_0$. It is assumed that four pixel values $p_0$, $p_1$, $q_0$, and $q_1$ are respectively pixel values corresponding to pixels $P_0$, $P_1$, $Q_0$, and $Q_1$. In the formula (1), round(x) means rounding x, for example, using a round-off, round-up, or round-down method. Weight values of $p_0$, $p_1$, $q_0$, and $q_1$ are $-a/c$, $b/c$, $a/c$, and $-b/c$ respectively. Herein a, b, and c are preset constants, and a weight value of each pixel may be determined by using an empirical value or pre-determined. Generally, the constant c may be generally set to 2 raised to the power of a positive integer, so that weighted summation can be converted into integer multiply-add and shift operations. For example, the preset constants a, b, and c may be 9, 3, and 16 respectively, that is, the filtering offset value of the to-be-filtered pixel may be determined according to the following formula:

$$\Delta_1 = \{[9(q_0-p_0)-3(q_1-p_1)]/16\} = [9(q_0-p_0)-3(q_1-p_1)+8] >> 4 \quad (2)$$

In addition, the first filtering offset value of the to-be-filtered pixel may also be determined according to the following formula:

$$\Delta_1 = \mathrm{round}[(a_0 p_0 + a_1 p_1 + a_2 p_2 + b_1 q_1 + b_2 q_2)/c] \quad (3)$$

where $a_0$, $a_1$, $a_2$, $b_1$, $b_2$, and c are preset constants, $p_0$ is the pixel value of the to-be-filtered pixel, and $p_1$, $p_2$, $q_1$, and $q_2$ are pixel values of four pixels $P_1$, $P_2$, $Q_1$, and $Q_2$ in the first neighbouring partition. The constant c may be generally set to 2 raised to the power of a positive integer, for example, c=16, c=32, or c=64, so that weighted summation can be converted into integer multiply-add and shift operations. Optionally, $a_0$, $a_1$, $a_2$, and $b_1$ may be generally set to integers. For example, parameters in the formula (3) may be set as follows: $a_0=-16$, $a_1=5$, $a_2=5$, $b_1=3$, $b_2=3$, and c=16. For another example, $a_0=-17$, $a_1=10$, $a_2=5$, $b_1=6$, $b_2=-4$, and c=32.

A filtering offset value of the pixel $Q_0$ may be $-\Delta_1$, or may be computed in another weighted summation manner. For example, when two pixels are symmetric about a boundary of a block (for example, two pixels closest or closer to the boundary of the block), filtering offset values of the two pixels that are symmetric about the boundary of the block may be equal but signs are opposite. Alternatively, different weighted summation manners may be used for computing the two pixels respectively. This is not limited in this embodiment of the present disclosure.

In an embodiment of the present disclosure, filtering offset values of all pixels may be obtained through computation independently, or may be obtained through computation by using filtering offset values of neighbouring pixels and pixel values of the neighbouring pixels. For example, the filtering offset value of the pixel may be obtained according to the following formula (4) or (5) by using filtering offset values of neighbouring pixels and pixel values of the neighbouring pixels.

Filtering offset values $\Delta_{P_1}$ and $\Delta_{Q_1}$ of pixels $P_1$ and $Q_1$ may be:

$$\Delta_{P_1} = \{[9(p_2+p_0+1)>>1]-p_1+\Delta_1\}>>1 \quad (4)$$

$$\Delta_{P_1} = \{[9(p_2+p_0+1)>>1]-p_1+\Delta_1\}>>1 \quad (5)$$

In an embodiment of the present disclosure, prediction may be performed on the pixel value of the to-be-filtered pixel according to the pixel values of the pixels in the second neighbouring partition of the to-be-filtered pixel to obtain the prediction value of a filtered value of the to-be-filtered pixel.

It should be understood that both the first neighbouring partition and the second neighbouring partition in this embodiment of the present disclosure are neighborhoods of the to-be-filtered pixel, and they may be a same region, or they may be different regions. For example, the first neighbouring partition and the second neighbouring partition are the same.

Optionally, weighted summation may be performed on pixel values of at least two pixels that are in the second neighbouring partition and located on two sides of the to-be-filtered pixel, to obtain the prediction value of a filtered value of the to-be-filtered pixel.

The performing weighted summation on pixel values of at least two pixels that are in the second neighbouring partition and located on two sides of the to-be-filtered pixel, to obtain the prediction value of a filtered value of the to-be-filtered pixel includes: determining the prediction value of a filtered value of the to-be-filtered pixel according to the following formula:

$$r = \mathrm{round}[(d_1 p_1 + d_2 p_2 + \ldots + d_N p_N)/d_{N+1}], \quad (6)$$

where $d_1$, $d_2$, ... $d_N$, and $d_{N+1}$ are preset parameters, $d_{N+1} = d_1 + d_2 + \ldots + d_N$, $p_1$, $p_2$, ..., $p_N$ are N pixel values respectively corresponding to N pixels that are in the second neighbouring partition and located on the two sides of the to-be-filtered pixel, and N is an integer greater than or equal to 2.

When N in the formula (6) is equal to 2, a prediction value of a filtered value of $P_0$ may be computed by using two pixels in the second neighbouring partition of the pixel $P_0$, for example, pixels $P_1$ and $Q_1$ on two sides of $P_0$. A computing formula is as follows:

$$r = \mathrm{round}[(d_1 p_1 + d_2 p_2)/d_3] \quad (7)$$

where $d_1$, $d_2$, and $d_3$ are preset parameters, and $d_3 = d_1 + d_2$. Generally, the constant c may be generally set to 2 raised to the power of a positive integer, so that weighted summation can be converted into integer multiply-add and shift operations.

Specific numeric values of $d_1$, $d_2$, and $d_3$ are not limited in this embodiment of the present disclosure. For example, $d_1=2$, $d_2=1$, and $d_3=3$ may be used. In this case, the prediction value of a filtered value of the to-be-filtered pixel is located on a connection line between pixels corresponding to pixels $P_1$ and $Q_1$, that is, the prediction value of a filtered value r of the to-be-filtered pixel is a linear interpolated value between pixel values $p_1$ and $q_1$. For another example, $d_1=5$, $d_2=3$, and $d_3=8$. For another example, $d_1=13$, $d_2=3$, and $d_3=16$.

In the formula (6), N is an integer that is greater than or equal to 2. The prediction value of a filtered value of the to-be-filtered pixel may be estimated only by using at least two pixels in the second neighbouring partition of the to-be-filtered pixel. For example, a weighted sum of pixel values $p_2$, $p_1$ and $q_1$ corresponding to the pixels $P_2$, $P_1$ and $Q_1$ may also be used as the prediction value of a filtered value of the to-be-filtered pixel, and weights corresponding to the pixel values $p_2$, $p_1$, and $q_1$ may be 6/16, 11/16, and −1/16 respectively. For another example, a weighted sum of pixel values $P_3$, $P_2$, $P_1$, $q_0$, $q_1$, and $q_2$ corresponding to the pixels $P_3$, $P_2$, $P_1$, $Q_0$, $Q_1$, and $Q_2$ may also be used as the prediction value of a filtered value of the to-be-filtered pixel, and weights corresponding to the pixel values $P_3$, $P_2$, $P_1$, $q_0$, $q_1$, and $q_2$ may be 1/32, −5/32, 20/32, 20/32, −5/32, and 1/32 respectively, the prediction value of a filtered value of the to-be-filtered pixel in this embodiment of the present disclosure may be obtained according to a fitted function. The performing prediction on the pixel value of the to-be-filtered pixel according to pixel values of pixels in a second neighbouring partition of the to-be-filtered pixel to obtain a prediction value of a filtered value of the to-be-filtered pixel includes: determining a fitted curve, where the fitted curve includes fitted parameters; fitting at least two pixels in the second neighbouring partition according to the fitted curve to obtain values of the fitted parameters; and obtaining the prediction value of a filtered value of the to-be-filtered pixel according to the values of the fitted parameters and the fitted curve.

For example, a function may be preset and parameters in the function may be set, and the function is fitted by using the at least two pixels in the second neighbouring partition and pixel values corresponding to the at least two pixels to obtain parameter values in the function. Then a value of the to-be-filtered pixel is substituted into the function obtained by fitting, and the prediction value of a filtered value of the to-be-filtered pixel is obtained.

The specific fitted curve is not limited in this embodiment of the present disclosure, and curves of various forms may be all used as fitted curves.

For example, the fitted curve may be:

$$S(t) = \frac{1}{1+e^{-\partial t}} \times \beta + \gamma, \qquad (8)$$

where t is a distance from the to-be-filtered pixel to a boundary of the picture block, and values of ∂, β, and γ may be determined according to the fitted curve, distances from at least three pixels that are in the second neighbouring partition and located on two sides of the to-be-filtered pixel to the boundary of the picture block, and pixel values corresponding to the at least three pixels.

A function in the formula (8) may be fitted according to distances $t_{p_2}$, $t_{p_1}$, $t_{q_1}$, and $t_{q_2}$ from the pixels $P_2$, $P_1$, $Q_1$, and $Q_2$ in the second neighbouring partition to the boundary of the block, and pixel values $S(t_{p_2})$, $S(t_{p_1})$, $S(t_{q_1})$, and $S(t_{q_2})$ corresponding to the pixels. For example, $t_{p_2}$, $t_{p_1}$, $t_{q_1}$, and $t_{q_2}$ may be −2.5, −1.5, 1.5, and 2.5 respectively; four groups of data, namely, (−2.5, $p_2$), (−1.5, $p_1$), (1.5, $q_1$), and (2.5, $q_2$), may be used to obtain one group of α, β, and γ, so that the prediction values $S(t_{p_2})$, $S(t_{p_1})$, $S(t_{q_1})$, and $S(t_{q_2})$ obtained according to the fitted function in the formula (8) are sufficiently close to $p_2$, $p_1$, $q_1$, and $q_2$.

It should be understood that when the parameters in the fitted function are obtained, to reduce computational complexity, the function may be fitted by using different pixels in the second neighbouring partition, to obtain multiple groups of preset parameters. Then, the multiple groups of preset parameters are traversed; given each group of preset parameters, a mean square deviation between pixel values of multiple pixels and the pixel prediction value is computed, and a group of preset parameters that minimize mean square deviation of the multiple pixels are used as final fitted parameters of the function. Alternatively, the multiple groups of preset parameters may be traversed; given each group of preset parameters, a sum of differences between pixel values of multiple pixels and the pixel prediction value is computed, and when the sum of differences is less than a threshold, the group of preset parameters are used as final fitted parameters of the function. Herein the threshold may be preset.

After the final fitted preset parameters are obtained, the distance from the to-be-filtered pixel to the boundary of the block may be substituted into the function obtained by fitting, and the pixel prediction value of the to-be-filtered pixel is obtained. For example, distances $t_{p_0}$ and $t_{q_0}$ from pixels $P_0$ and $Q_0$ to the boundary of the block are −0.5 and 0.5 respectively, and in this case, pixel prediction values of the pixels $P_0$ and $Q_0$ are S(−0.5) and S(0.5) respectively.

It should be understood that a function selected for curve fitting is not limited in this embodiment of the present disclosure. For example, in addition to the fitted function in the formula (8), functions of other types may be used for fitting. Preset parameters in the fitted function may be determined by selecting pixels in the second neighbouring partition and pixel values corresponding to the pixels. After the preset parameters in the fitted function are determined, the distance from the to-be-filtered pixel to the boundary of the block may be substituted into the function, and the prediction value of a filtered value of the to-be-filtered pixel is obtained.

For another example, the fitted curve may also be:

$$S(t) = \frac{t}{\sqrt{1+t^2}} \times \beta + \gamma, \qquad (9)$$

where t is a distance from the to-be-filtered pixel to a boundary of the picture block, and values of β and γ may be determined according to the fitted curve, distances from at least two pixels that are in the second neighbouring partition and located on two sides of the to-be-filtered pixel to the boundary of the picture block, and pixel values corresponding to the at least two pixels.

For another example, the fitted curve may also be:

$$S(t) = \tan h(\partial t) \times \beta + \gamma, \qquad (10)$$

where t is a distance from the to-be-filtered pixel to a boundary of the picture block, and values of ∂, β, and γ may be determined according to the fitted curve, distances from at least two pixels that are in the second neighbouring partition and located on two sides of the to-be-filtered pixel to the boundary of the picture block, and pixel values corresponding to the at least two pixels.

In an embodiment of the present disclosure, a value obtained according to the current pixel value, the first filtering offset value, and the prediction value of a filtered value may be used as the actual filtered value of the to-be-filtered pixel.

Optionally, whether a value obtained by adding the first filtering offset value to the current pixel value is farther away from the prediction value of a filtered value than the current pixel value is determined, and the actual filtered value is determined according to a determining result. For example, a first absolute value of a difference obtained by subtracting the prediction value of a filtered value from a sum of the current pixel value and the first filtering offset value is compared with a second absolute value of a difference obtained by subtracting the prediction value of a filtered value from the current pixel value; and the actual filtered value is determined according to a comparison result.

For example, when the value obtained by adding the first filtering offset value $\Delta_1$ to the current pixel value is farther away from the prediction value of a filtered value than the current pixel value, a value obtained by adding a second filtering offset value $\Delta_2$ to the current pixel value is used as the actual filtered value, where $\Delta_2 = \delta \Delta_1$, $\Delta_1$ indicates the first filtering offset value, and −1<δ<1; or when the value obtained by adding the first filtering offset value to the current pixel value is equal to the prediction value of a filtered value or closer to the prediction value of a filtered value than the current pixel value, the current pixel value plus the first filtering offset value is used as the actual filtered value. That is, when the first absolute value is greater than the second absolute value, the value obtained by adding the second filtering offset value $\Delta_2$ to the current pixel value is used as the actual filtered value, where $\Delta_2=\delta\Delta_1$, $\Delta_1$ indicates the first filtering offset value, and $-1<\delta<1$; or when the first absolute value is less than or equal to the second absolute value, the value obtained by adding the first filtering offset value to the current pixel value is used as the actual filtered value.

The actual filtered value in this embodiment of the present disclosure may make overall smoothness of a signal better, and enhance a subjective visual effect and coding efficiency. In principle, the actual filtered value is closer to the prediction value of a filtered value than the current pixel value plus the first filtering offset value.

In this embodiment of the present disclosure, a specific method for determining whether the current pixel value plus the first filtering offset value is farther away from the prediction value of a filtered value than the current pixel value is not limited.

For example, a first distance between the current pixel value plus the first filtering offset value and the prediction value of a filtered value may be compared with a second distance between the current pixel value and the prediction value of a filtered value. In this way, whether the current pixel value of the to-be-filtered pixel plus the filtering offset value is farther away from the prediction value of a filtered value than the current pixel value of the to-be-filtered pixel is determined. When the first distance is greater than the second distance, whether the current pixel value of the to-be-filtered pixel plus the filtering offset value is farther away from the prediction value of a filtered value than the current pixel value of the to-be-filtered pixel is determined. When the first distance is less than the second distance, whether the current pixel value of the to-be-filtered pixel plus the filtering offset value is closer to the prediction value of a filtered value than the current pixel value of the to-be-filtered pixel is determined. When the first distance is equal to the second distance, whether the current pixel value of the to-be-filtered pixel plus the filtering offset value is as close to the prediction value of a filtered value as the current pixel value of the to-be-filtered pixel is determined.

In this embodiment of the present disclosure, other equivalent manners may also be used to determine whether the current pixel value plus the first filtering offset value is farther away from the prediction value of a filtered value than the current pixel value. Details are not further described herein.

Optionally, whether a sign of a difference obtained by subtracting the prediction value of a filtered value from the current pixel value is the same as a sign of the first filtering offset value is determined, and the actual filtered value is determined according to a determining result. For example, when the sign of the difference obtained by subtracting the prediction value of a filtered value from the current pixel value is the same as the sign of the first filtering offset value $\Delta_1$, a value obtained by adding a second filtering offset value $\Delta_2$ to the current pixel value is used as the actual filtered value, where $\Delta_2=\delta\Delta_1$, $\Delta_1$ indicates the first filtering offset value, and $-1<\delta<1$; or when the sign of the difference obtained by subtracting the prediction value of a filtered value from the current pixel value is opposite to the sign of the first filtering offset value $\Delta_1$, a value obtained by adding the first filtering offset value to the current pixel value is used as the actual filtered value. Herein the sign is a plus sign or a minus sign, that is, the sign may be plus, or may be minus.

When the sign of the difference obtained by subtracting the prediction value of a filtered value from the current pixel value is the same as the sign of the first filtering offset value $\Delta_1$, the current pixel value of the to-be-filtered pixel plus the first filtering offset value is farther away from the prediction value of a filtered value than the current pixel value.

When the sign of the difference obtained by subtracting the prediction value of a filtered value from the current pixel value is opposite to the sign of the first filtering offset value $\Delta_1$, the actual filtered value may be determined directly according to the foregoing sign relationship. Alternatively further, whether the current pixel value plus the first filtering offset value is farther away from the prediction value of a filtered value than the current pixel value may continue to be determined, so that the actual filtered value is determined. A specific determining method is already described above, and is not further described herein.

It should be understood that all solutions to determining the actual filtered value of the to-be-filtered pixel according to the current pixel value, the first filtering offset value, and the prediction value of a filtered value shall fall within the protection scope of the present disclosure, and the foregoing illustrated several implementations are not intended to limit the protection scope of the present disclosure.

Optionally, the actual filtered value of the to-be-filtered pixel may be determined according to a determining result. For example, when the current pixel value plus the first filtering offset value $\Delta_1$ is farther away from the prediction value of a filtered value than the current pixel value, a value obtained by adding a second filtering offset value $\Delta_2$ to the current pixel value is used as the actual filtered value, where $\Delta_2=\delta\Delta_1$, $\Delta_1$ indicates the first filtering offset value, and $-1<\delta<1$. When the current pixel value plus the first filtering offset value is closer to the prediction value of a filtered value than the current pixel value, the current pixel value plus the first filtering offset value is used as the actual filtered value.

The foregoing scaling coefficient $\delta$ may be preset by an encoder, or may be obtained by an encoder by making an analysis and a decision. The encoder may decide the scaling coefficient by using the following method: for example, given multiple different numeric values $\delta_i$, attempting to perform deblocking filtering on a picture, where i=1, 2, . . . , I, and I is a positive integer greater than 1; selecting, from the multiple scaling coefficients, a scaling coefficient with optimal coding efficiency as a decision result, where the optimal coding efficiency may be that a mean square deviation of the filtered pixels in the filtered picture is minimal; and then writing the decision result into a bit stream, for example, writing the decision result into a syntactic structure such as a slice header (slice header) or a picture parameter set (picture parameter set, PPS). A decoder may restore the scaling coefficient by parsing a syntactic element about the scaling coefficient in the bit stream, and use the scaling coefficient to perform deblocking filtering on the decoder.

When a numeric value obtained by adding the filtering offset value to the current pixel value of the to-be-filtered pixel exceeds a dynamic range of a picture signal, the numeric value may be adjusted within the dynamic range. For example, for a picture signal with a width of 8 bits, a dynamic range of the picture is generally 0 to 255. If the numeric value obtained by adding the filtering offset value to the current pixel value of the to-be-filtered pixel is greater than 255 or less than 0, the numeric value needs to be limited within the range of 0 to 255. Generally, a numeric value of a result less than 0 is clipped to 0, and a numeric value of a result greater than 255 is clipped to 255.

It should be understood that in this embodiment of the present disclosure, to-be-filtered pixels are independent of each other. One to-be-filtered pixel in a blocking artifact may be processed separately, or multiple to-be-filtered pixels may be processed simultaneously. When processing is performed on multiple to-be-filtered pixels to compute filtering offset values or prediction value of filtered values, a same formula may be used, or different formulas may be used.

After processing is performed on the to-be-filtered pixel in the blocking artifact, overall waveform smoothness of the signal may be improved, and the subjective visual effect and coding efficiency of the picture are enhanced.

A specific fitted curve for the prediction value of a filtered value of the to-be-filtered pixel is not limited in this embodiment of the present disclosure. The following uses two examples for description.

Figure 3:
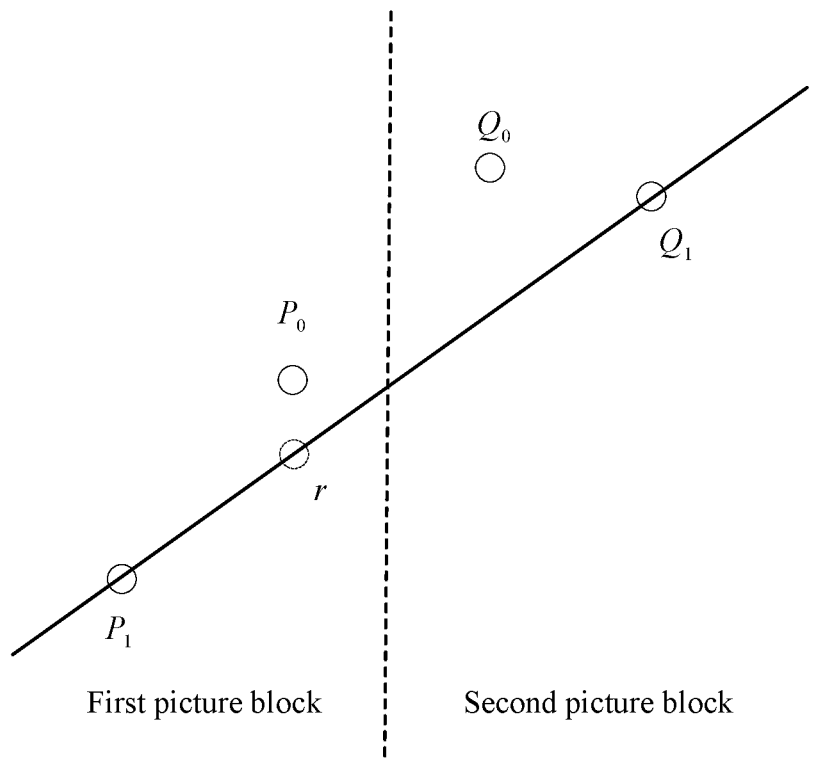
FIG. 3 is a schematic diagram of a prediction value of a filtered value that is of a to-be-filtered pixel and is obtained based on linear prediction according to an embodiment of the present disclosure.

FIG. 3 is a schematic diagram of a prediction value of a filtered value that is of a to-be-filtered pixel and is obtained based on linear prediction according to an embodiment of the present disclosure.

In an embodiment of the present disclosure, the prediction value of a filtered value of $P_0$ may be computed by using two pixels in the second neighbouring partition of the pixel $P_0$, for example, pixels $P_1$ and $Q_1$ on two sides of $P_0$. A computing formula is as follows:

$$r = \text{round}[(d_1 p_1 + d_2 p_2)/d_3] \qquad (7)$$

where $d_1$, $d_2$, and $d_3$ are preset parameters, and $d_3 = d_1 + d_2$.

The pixels $P_1$ and $Q_1$ on the two sides of $P_0$ are used for fitting to obtain a line shown in FIG. 3 and parameter values corresponding to the line. Then linear prediction is performed on the to-be-filtered pixel $P_0$ by using the line, and the prediction value of a filtered value r corresponding to $P_0$ is obtained.

Figure 4:
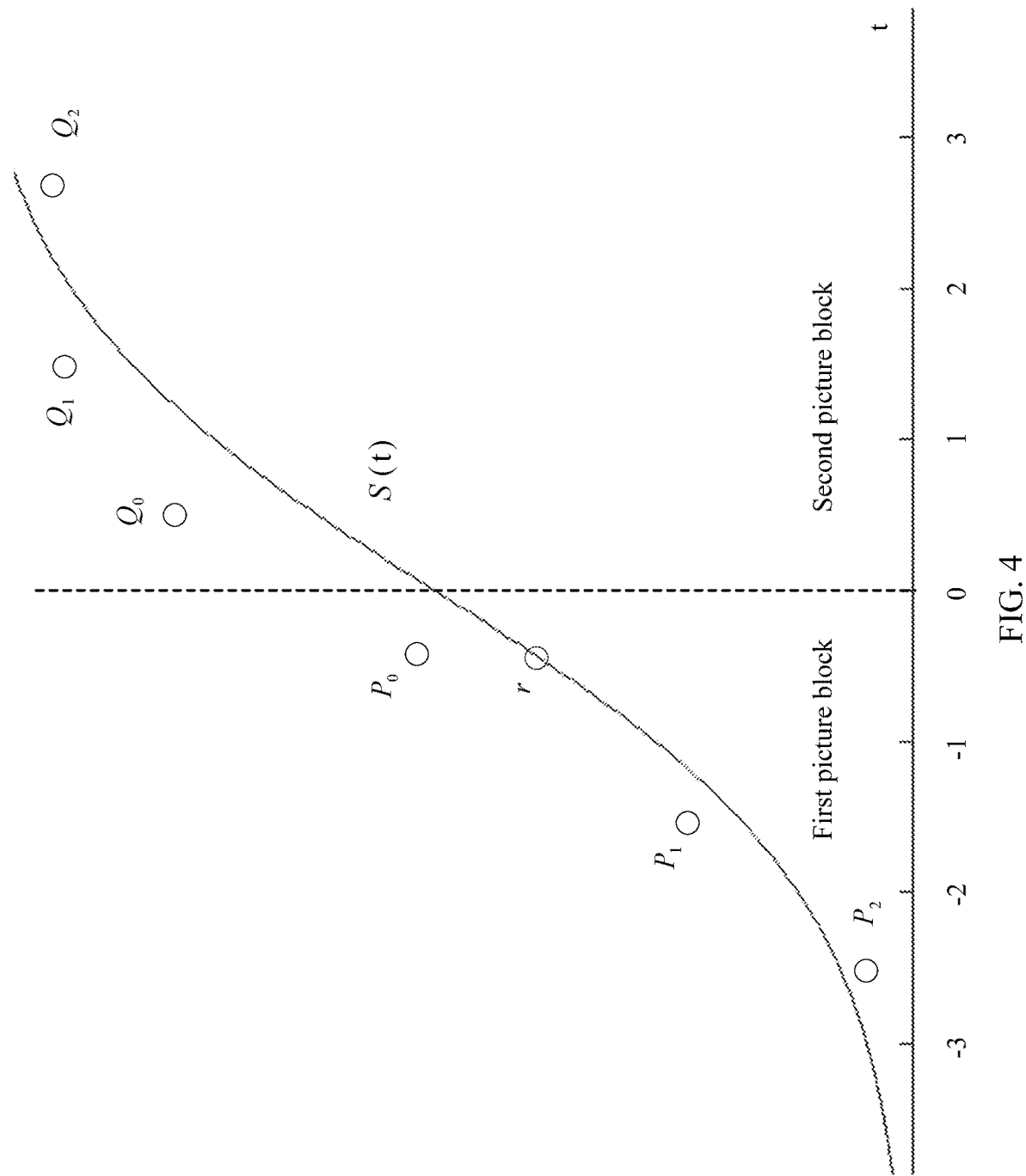
FIG. 4 is a schematic diagram of a prediction value of a filtered value that is of a to-be-filtered pixel and is obtained by performing prediction based on function fitting according to another embodiment of the present disclosure.

FIG. 4 is a schematic diagram of a prediction value of a filtered value that is of a to-be-filtered pixel and is obtained by performing prediction based on function fitting according to another embodiment of the present disclosure.

In an embodiment of the present disclosure, the prediction value of a filtered value may be determined according to the following formula:

$$S(t) = \frac{1}{1 + e^{-\partial t}} \times \beta + \gamma, \qquad (8)$$

where t is a distance from the to-be-filtered pixel to a boundary of the picture block, and values of $\partial$, $\beta$, and $\gamma$ are determined according to distances from at least three pixels that are in the second neighbouring partition and located on two sides of the to-be-filtered pixel to the boundary of the picture block, and pixel values corresponding to the at least three pixels.

A function in the formula (8) may be fitted according to distances $t_{p_2}$, $t_{p_1}$, $t_{q_1}$, and $t_{q_2}$ from the pixels $P_2$, $P_1$, $Q_1$, and $Q_2$ in the second neighbouring partition to the boundary of the block, and pixel values $S(t_{p_2})$, $S(t_{p_1})$, $S(t_{q_1})$, and $S(t_{q_2})$ corresponding to the pixels. For example, $t_{p_2}$, $t_{p_1}$, $t_{q_1}$, and $t_{q_2}$ may be $-2.5$, $-1.5$, $1.5$, and $2.5$ respectively; four groups of data, namely, $(-2.5, p_2)$, $(-1.5, p_1)$, $(1.5, q_1)$, and $(2.5, q_2)$, may be used to obtain one group of $\alpha$, $\beta$, and $\gamma$, so that the prediction values $S(t_{p_2})$, $S(t_{p_1})$, $S(t_{q_1})$, and $S(t_{q_2})$ obtained according to the fitted function in the formula (8) are sufficiently close to $p_2$, $p_1$, $q_1$, and $q_2$.

After the final fitted preset parameters are obtained, the distance from the to-be-filtered pixel to the boundary of the block may be substituted into the function obtained by fitting, and the pixel prediction value of the to-be-filtered pixel is obtained. For example, distances $t_{p_0}$ and $t_{q_0}$ from pixels $P_0$ and $Q_0$ to the boundary of the block are $-0.5$ and $0.5$ respectively, and in this case, pixel prediction values of the pixels $P_0$ and $Q_0$ are $S(-0.5)$ and $S(0.5)$ respectively.

The foregoing describes in detail the deblocking filtering method according to the embodiment of the present disclosure from a perspective of a deblocking filter with reference to FIG. 2 to FIG. 4. The following describes an apparatus block diagram of a deblocking filter according to an embodiment of the present disclosure from a perspective of a deblocking filter with reference to FIG. 5 and FIG. 6.

Figure 5:
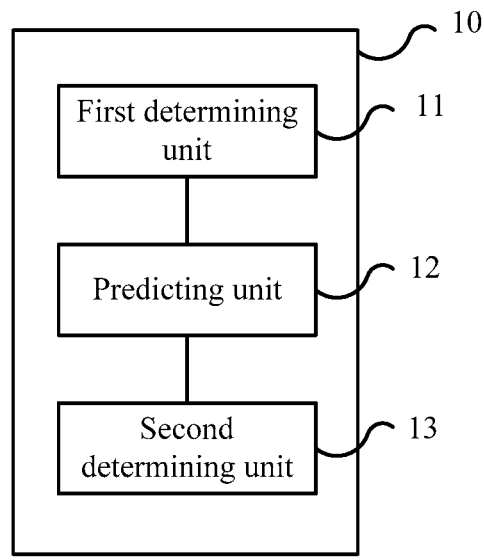
FIG. 5 is a block diagram of a deblocking filter according to an embodiment of the present disclosure.

FIG. 5 is a block diagram of a deblocking filter according to an embodiment of the present disclosure. The deblocking filter in FIG. 5 includes a first determining unit 11, a predicting unit 12, and a second determining unit 13.

The first determining unit 11 is configured to determine, according to a current pixel value of a to-be-filtered pixel in a picture block and pixel values of pixels in a first neighbouring partition of the to-be-filtered pixel, a first filtering offset value of the to-be-filtered pixel, where the to-be-filtered pixel is a pixel located at a boundary of a picture block that has a blocking artifact in a picture.

The predicting unit 12 is configured to perform prediction on the pixel value of the to-be-filtered pixel according to pixel values of pixels in a second neighbouring partition of the to-be-filtered pixel to obtain a prediction value of a filtered value of the to-be-filtered pixel.

The second determining unit 13 is configured to determine an actual filtered value of the to-be-filtered pixel according to the current pixel value, the first filtering offset value obtained by the first determining unit, and the prediction value of a filtered value obtained by the predicting unit.

In this embodiment of the present disclosure, the filtering offset value and prediction value of a filtered value of the to-be-filtered pixel are determined by using the pixel values of the neighbouring pixels of the to-be-filtered pixel, and the actual filtered value is determined according to the filtering offset value, the current pixel value, and the prediction value of a filtered value. In this way, overall waveform smoothness of a filtered signal can be improved.

Optionally, in an embodiment of the present disclosure, the second determining unit is configured to: compute an absolute value of a difference obtained by subtracting a sum of the prediction value of a filtered value and the current pixel value from the first filtering offset value, to obtain a first absolute value; compute an absolute value of a difference obtained by subtracting the prediction value of a filtered value from the current pixel value, to obtain a second absolute value; compare the first absolute value with the second absolute value; and determine the actual filtered value according to a comparison result.

Optionally, in an embodiment of the present disclosure, the second determining unit is configured to: when the first absolute value is greater than the second absolute value, use a value obtained by adding a second filtering offset value $\Delta_2$ to the current pixel value, as the actual filtered value, where $\Delta_2 = \delta \Delta_1$, $\Delta_1$ indicates the first filtering offset value, and $-1 < \delta < 1$; or when the first absolute value is less than or equal to the second absolute value, use a value obtained by adding the first filtering offset value to the current pixel value, as the actual filtered value.

Optionally, in an embodiment of the present disclosure, the second determining unit is configured to: determine whether a sign of a difference obtained by subtracting the prediction value of a filtered value from the current pixel value is the same as a sign of the first filtering offset value; and determine the actual filtered value according to a determining result.

Optionally, in an embodiment of the present disclosure, the second determining unit is configured to: when the sign of the difference obtained by subtracting the prediction value of a filtered value from the current pixel value is the same as the sign of the first filtering offset value $\Delta_1$, use a value obtained by adding a second filtering offset value $\Delta_2$ to the current pixel value, as the actual filtered value, where $\Delta_2 = \delta\Delta_1$, $\Delta_1$ indicates the first filtering offset value, and $-1<\delta<1$; or when the sign of the difference obtained by subtracting the prediction value of a filtered value from the current pixel value is opposite to the sign of the first filtering offset value $\Delta_1$, use a value obtained by adding the first filtering offset value to the current pixel value, as the actual filtered value.

Optionally, in an embodiment of the present disclosure, the predicting unit is configured to perform weighted summation on pixel values of at least two pixels that are in the second neighbouring partition and located on two sides of the to-be-filtered pixel, to obtain the prediction value of a filtered value of the to-be-filtered pixel.

Optionally, in an embodiment of the present disclosure, the predicting unit is configured to determine the prediction value of a filtered value according to the following formula: $r = \text{round}[(d_1 p_1 + d_2 p_2 + \ldots + d_N p_N)/d_{N+1}]$ where $d_1, d_2, \ldots, d_N$ and $d_{N+1}$ are preset parameters, $d_{N+1} = d_1 + d_2 + \ldots + d_N$, $p_1, p_2, \ldots, p_N$ are pixel values corresponding to N pixels that are in the second neighbouring partition and located on the two sides of the to-be-filtered pixel, and N is an integer greater than or equal to 2.

Optionally, in an embodiment of the present disclosure, the predicting unit is configured to: determine a fitted curve, where the fitted curve includes fitted parameters; fit at least two pixels in the second neighbouring partition according to the fitted curve to obtain values of the fitted parameters; and obtain the prediction value of a filtered value of the to-be-filtered pixel according to the values of the fitted parameters and the fitted curve.

Optionally, in an embodiment of the present disclosure, the fitted curve is $$S(t) = \frac{1}{1 + e^{-\partial t}} \times \beta + \gamma,$$

where t is a distance from the to-be-filtered pixel to a boundary of the picture block, and $\partial$, $\beta$, and $\gamma$ are the fitted parameters; and correspondingly, the predicting unit is configured to determine values of $\partial$, $\beta$, and $\gamma$ according to the fitted curve, distances from at least three pixels that are in the second neighbouring partition and located on two sides of the to-be-filtered pixel to the boundary of the picture block, and pixel values corresponding to the at least three pixels.

Optionally, in an embodiment of the present disclosure, the fitted curve is $$S(t) = \frac{t}{\sqrt{1+t^2}} \times \beta + \gamma,$$

where t is a distance from the to-be-filtered pixel to a boundary of the picture block, and $\beta$ and $\gamma$ are the fitted parameters; and correspondingly, the predicting unit is configured to determine values of $\beta$ and $\gamma$ according to the fitted curve, distances from at least two pixels that are in the second neighbouring partition and located on two sides of the to-be-filtered pixel to the boundary of the picture block, and pixel values corresponding to the at least two pixels.

Optionally, in an embodiment of the present disclosure, the fitted curve is $S(t) = \tan h(\partial t) \times \beta + \gamma$, where t is a distance from the to-be-filtered pixel to a boundary of the picture block, and $\partial$, $\beta$, and $\gamma$ are the fitted parameters; and correspondingly, the predicting unit is configured to determine values of $\partial$, $\beta$, and $\gamma$ according to the fitted curve, distances from at least two pixels that are in the second neighbouring partition and located on two sides of the to-be-filtered pixel to the boundary of the picture block, and pixel values corresponding to the at least two pixels.

Optionally, in an embodiment of the present disclosure, the first determining unit is configured to perform weighted summation on the current pixel value of the to-be-filtered pixel and a pixel value of at least one pixel in the first neighbouring partition to obtain the filtering offset value of the to-be-filtered pixel.

Optionally, in an embodiment of the present disclosure, the first neighbouring partition and the second neighbouring partition are the same.

The deblocking filter according to this embodiment of the present disclosure may correspond to the deblocking filtering method of the embodiment of the present disclosure. In addition, each unit/module in the deblocking filter and the foregoing other operations and/or functions are respectively intended to implement corresponding procedures in the deblocking filtering method shown in FIG. 2 to FIG. 4. Details are not further described herein for brevity.

Figure 6:
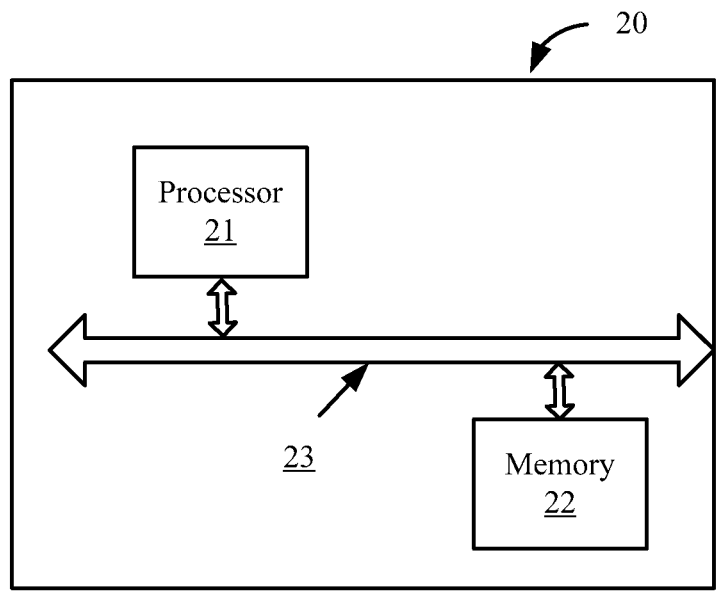
FIG. 6 is a block diagram of a deblocking filter according to an embodiment of the present disclosure.

FIG. 6 is a block diagram of a deblocking filter according to an embodiment of the present disclosure.

The deblocking filter 20 in FIG. 6 includes a processor 21 and a memory 22. The processor 21 controls an operation of the deblocking filter, and may be configured to process a signal. The memory 22 may include a read-only memory and a random access memory, and provide an instruction and data to the processor 21. Components in the deblocking filter 20 are coupled together by using a bus system 23. The bus system 23 further includes a power bus, a control bus, and a status signal bus, in addition to a data bus. However, for clear description, various buses in the figure are marked as the bus system 23.

The method disclosed by the foregoing embodiment of the present disclosure may be applied to the processor 21 or implemented by the processor 21. In an implementation process, each step of the foregoing method may be completed by using an integrated logic circuit of hardware in the processor 21 or an instruction in a form of software. The processor 21 may be a general purpose processor, a digital signal processor, an application-specific integrated circuit, a field programmable gate array, or another programmable logic device, discrete gate or transistor logic device, or discrete hardware component, and may implement or execute the method, steps, and logical block diagram disclosed in the method embodiment of the present disclosure. The general purpose processor may be a microprocessor, or any conventional processor, or the like. The steps of the method disclosed with reference to the embodiment of the present disclosure may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 22, and the processor 21 reads information in the memory 22 and completes the steps in the foregoing method in combination with hardware of the processor.

The processor 21 may determine, according to a current pixel value of a to-be-filtered pixel in a picture block and pixel values of pixels in a first neighbouring partition of the to-be-filtered pixel, a first filtering offset value of the to-be-filtered pixel, where the to-be-filtered pixel is a pixel located at a boundary of a picture block that has a blocking artifact in a picture.

The processor 21 may further perform prediction on the pixel value of the to-be-filtered pixel according to pixel values of pixels in a second neighbouring partition of the to-be-filtered pixel to obtain a prediction value of a filtered value of the to-be-filtered pixel.

The processor 21 may further determine an actual filtered value of the to-be-filtered pixel according to the current pixel value, the first filtering offset, and the prediction value of a filtered value.

In this embodiment of the present disclosure, the filtering offset value and prediction value of a filtered value of the to-be-filtered pixel are determined by using the pixel values of the neighbouring pixels of the to-be-filtered pixel, and the actual filtered value is determined according to the filtering offset value, the current pixel value, and the prediction value of a filtered value. In this way, overall waveform smoothness of a filtered signal can be improved.

Optionally, in an embodiment, the memory 22 stores an instruction so that the processor 21 performs the following operation: computing an absolute value of a difference obtained by subtracting a sum of the prediction value of a filtered value and the current pixel value from the first filtering offset value, to obtain a first absolute value; computing an absolute value of a difference obtained by subtracting the prediction value of a filtered value from the current pixel value, to obtain a second absolute value; comparing the first absolute value with the second absolute value; and determining the actual filtered value according to a comparison result.

Optionally, in an embodiment, the processor 21 may be further configured to: when the first absolute value is greater than the second absolute value, use a value obtained by adding a second filtering offset value $\Delta_2$ to the current pixel value, as the actual filtered value, where $\Delta_2=\delta\Delta_1$, $\Delta_1$ indicates the first filtering offset value, and $-1<\delta<1$; or when the first absolute value is less than or equal to the second absolute value, use a value obtained by adding the first filtering offset value to the current pixel value, as the actual filtered value.

Optionally, in an embodiment, the processor 21 may be further configured to: determine whether a sign of a difference obtained by subtracting the prediction value of a filtered value from the current pixel value is the same as a sign of the first filtering offset value; and determine the actual filtered value according to a determining result.

Optionally, in an embodiment, the processor 21 may be further configured to: when the sign of the difference obtained by subtracting the prediction value of a filtered value from the current pixel value is the same as the sign of the first filtering offset value $\Delta_1$, use a value obtained by adding a second filtering offset value $\Delta_2$ to the current pixel value, as the actual filtered value, where $\Delta_2=\delta\Delta_1$, $\Delta_1$ indicates the first filtering offset value, and $-1<\delta<1$; or when the sign of the difference obtained by subtracting the prediction value of a filtered value from the current pixel value is opposite to the sign of the first filtering offset value $\Delta_1$, use a value obtained by adding the first filtering offset value to the current pixel value, as the actual filtered value.

Optionally, in an embodiment, the processor 21 may be further configured to perform weighted summation on pixel values of at least two pixels that are in the second neighbouring partition and located on two sides of the to-be-filtered pixel, to obtain the prediction value of a filtered value of the to-be-filtered pixel.

Optionally, in an embodiment, the processor 21 may be further configured to determine the prediction value of a filtered value according to the following formula:

$$r=\text{round}[(d_1p_1+d_2p_2+\ldots+d_Np_N)/d_{N+1}],$$

where $d_1, d_2, \ldots, d_N$, and $d_{N+1}$ are preset parameters, $d_{N+1}=d_1+d_2+\ldots+d_N$, $p_1, p_2, \ldots, p_N$ are pixel values corresponding to N pixels that are in the second neighbouring partition and located on the two sides of the to-be-filtered pixel, and N is an integer greater than or equal to 2.

Optionally, in an embodiment, the processor 21 may be further configured to: determine a fitted curve, where the fitted curve includes fitted parameters; fit at least two pixels in the second neighbouring partition according to the fitted curve to obtain values of the fitted parameters; and obtain the prediction value of a filtered value of the to-be-filtered pixel according to the values of the fitted parameters and the fitted curve.

Optionally, in an embodiment, the fitted curve is:

$$S(t) = \frac{1}{1+e^{-\partial t}} \times \beta + \gamma,$$

where t is a distance from the to-be-filtered pixel to a boundary of the picture block, and $\partial$, $\beta$, and $\gamma$ are the fitted parameters; and correspondingly, the processor is configured to determine values of $\partial$, $\beta$, and $\gamma$ according to the fitted curve, distances from at least three pixels that are in the second neighbouring partition and located on two sides of the to-be-filtered pixel to the boundary of the picture block, and pixel values corresponding to the at least three pixels.

Optionally, in an embodiment, the fitted curve is:

$$S(t) = \frac{t}{\sqrt{1+t^2}} \times \beta + \gamma,$$

where t is a distance from the to-be-filtered pixel to a boundary of the picture block, and $\beta$ and $\gamma$ are the fitted parameters; and the processor is configured to determine values of $\beta$ and $\gamma$ according to the fitted curve, distances from at least two pixels that are in the second neighbouring partition and located on two sides of the to-be-filtered pixel to the boundary of the picture block, and pixel values corresponding to the at least two pixels.

Optionally, in an embodiment, the fitted curve is:

$$S(t)=\tan h(\partial t)\times\beta+\gamma,$$

where t is a distance from the to-be-filtered pixel to a boundary of the picture block, and $\partial$, $\beta$, and $\gamma$ are the fitted parameters; and correspondingly, the processor is configured to determine values of $\partial$, $\beta$, and $\gamma$ according to the fitted curve, distances from at least two pixels that are in the second neighbouring partition and located on two sides of the to-be-filtered pixel to the boundary of the picture block, and pixel values corresponding to the at least two pixels.

Optionally, in an embodiment, the processor 21 may be further configured to perform weighted summation on the current pixel value of the to-be-filtered pixel and a pixel value of at least one pixel in the first neighbouring partition to obtain the filtering offset value of the to-be-filtered pixel.

Optionally, in an embodiment, the first neighbouring partition and the second neighbouring partition are the same.

The deblocking filter according to this embodiment of the present disclosure may correspond to the deblocking filtering method in the method of the embodiment of the present disclosure. In addition, each unit/module in the deblocking filter and the foregoing other operations and/or functions are respectively intended to implement corresponding procedures in the deblocking filtering method shown in FIG. 2 to FIG. 4. Details are not further described herein for brevity.

It should be understood that "an embodiment" or "an embodiment" mentioned in the whole specification does not mean that particular features, structures, or characteristics related to the embodiment are included in at least one embodiment of the present disclosure. Therefore, "in an embodiment" or "in an embodiment" appearing throughout the specification does not refer to a same embodiment. In addition, these particular features, structures, or characteristics may be combined in one or more embodiments by using any appropriate manner.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

It should be understood that in the embodiments of the present disclosure, "B corresponding to A" indicates that B is associated with A, and B may be determined according to A. However, it should further be understood that determining A according to B does not mean that B is determined according to A only; that is, B may also be determined according to A and/or other information.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present disclosure.

Methods or steps described in the embodiments disclosed in this specification may be implemented by hardware, a software program executed by a processor, or a combination thereof. The software program may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

The present disclosure is described in detail with reference to the accompany drawings, but the present disclosure is not limited thereto. Various equivalent modifications or replacements can be made to the embodiments of the present disclosure by a person of ordinary skill in the art without departing from the spirit and essence of the present disclosure, and the modifications or replacements shall fall within the scope of the present disclosure.

What is claimed is:

1. A deblocking filtering method comprising:

determining, according to a current pixel value of a to-be-filtered pixel in a picture block and pixel values of pixels in a first neighbouring partition of the to-be-filtered pixel, a first filtering offset value of the to-be-filtered pixel;

performing prediction on the current pixel value of the to-be-filtered pixel according to pixel values of pixels in a second neighbouring partition of the to-be-filtered pixel to obtain a prediction value of a filtered value of the to-be-filtered pixel; and determining an actual filtered value of the to-be-filtered pixel according to the current pixel value, the first filtering offset value, and the prediction value of a filtered value, wherein determining the actual filtered value comprises:

determining whether a sign of a difference obtained by subtracting the prediction value of a filtered value from the current pixel value is the same as a sign of the first filtering offset value;

determining the actual filtered value according to a determining result; and when the sign of the difference obtained by subtracting the prediction value of a filtered value from the current pixel value is the same as the sign of the first filtering offset value $\Delta_1$, using a value obtained by adding a second filtering offset value $\Delta_2$ to the current pixel value, as the actual filtered value, wherein $\Delta_2 = \delta\Delta_1$, $\Delta_1$ indicates the first filtering value, and $-1 < \delta < 1$; or when the sign of the difference obtained by subtracting the prediction value of a filtered value from the current pixel value is opposite the sign of the first filtering offset value $\Delta_1$, using a value obtained by adding the first filtering offset value to the current pixel value, as the actual filtered value.

2. The method according to claim 1, wherein the determining the actual filtered value of the to-be-filtered pixel according to the current pixel value, the first filtering offset value, and the prediction value of a filtered value comprises:

computing an absolute value of a difference obtained by subtracting a sum of the prediction value of a filtered value and the current pixel value from the first filtering offset value, to obtain a first absolute value;

computing an absolute value of a difference obtained by subtracting the prediction value of a filtered value from the current pixel value, to obtain a second absolute value; and comparing the first absolute value with the second absolute value; and determining the actual filtered value according to a comparison result.

3. The method according to claim 2, wherein the determining the actual filtered value according to the comparison result comprises:

when the first absolute value is greater than the second absolute value, using a value obtained by adding a second filtering offset value $\Delta_2$ to the current pixel value, as the actual filtered value, wherein $\Delta_2 = \delta \Delta_1$, $\Delta_1$ indicates the first filtering offset value, and $-1 < \delta < 1$; or when the first absolute value is less than or equal to the second absolute value, using a value obtained by adding the first filtering offset value to the current pixel value, as the actual filtered value.

4. The method according to claim 1, wherein the performing prediction on the pixel value of the to-be-filtered pixel according to the pixel values of pixels in the second neighbouring partition of the to-be-filtered pixel to obtain the prediction value of a filtered value of the to-be-filtered pixel comprises:

performing weighted summation on pixel values of at least two pixels that are in the second neighbouring partition and located on two sides of the to-be-filtered pixel, to obtain the prediction value of a filtered value of the to-be-filtered pixel.

5. The method according to claim 1, wherein the performing the prediction on the pixel value of the to-be-filtered pixel according to the pixel values of pixels in the second neighbouring partition of the to-be-filtered pixel to obtain the prediction value of a filtered value of the to-be-filtered pixel comprises:

determining a fitted curve, wherein the fitted curve comprises fitted parameters;

fitting at least two pixels in the second neighbouring partition according to the fitted curve to obtain values of the fitted parameters; and obtaining the prediction value of a filtered value of the to-be-filtered pixel according to the values of the fitted parameters and the fitted curve.

6. The method according to claim 1, wherein the determining the first filtering offset value of the to-be-filtered pixel comprises:

performing weighted summation on the current pixel value of the to-be-filtered pixel and a pixel value of at least one pixel in the first neighbouring partition to obtain the filtering offset value of the to-be-filtered pixel.

7. The method according to claim 1, wherein the first neighbouring partition and the second neighbouring partition are the same.

8. A deblocking filter, comprising:
a processor; and
a memory coupled to the processor, the memory including a non-transitory computer-readable medium having processor-readable instructions stored thereon which when executed cause the processor to implement operations including:

determining, according to a current pixel value of a to-be-filtered pixel in a picture block and pixel values of pixels in a first neighbouring partition of the to-be-filtered pixel, a first filtering offset value of the to-be-filtered pixel;

performing prediction on the current pixel value of the to-be-filtered pixel according to pixel values of pixels in a second neighbouring partition of the to-be-filtered pixel to obtain a prediction value of a filtered value of the to-be-filtered pixel; and determining an actual filtered value of the to-be-filtered pixel according to the current pixel value, the first filtering offset value, and the prediction value of a filtered value, wherein for determining an actual filtered value, the operations further include:

determining whether a sign of a difference obtained by subtracting the prediction value of a filtered value from the current pixel value is the same as a sign of the first filtering offset value;

determining the actual filtered value according to a determining result; and when the sign of the difference obtained by subtracting the prediction value of a filtered value from the current pixel value is the same as the sign of the first filtering offset value $\Delta_1$, using a value obtained by adding a second filtering offset value $\Delta_2$ to the current pixel value, as the actual filtered value, wherein $\Delta_2 = \delta \Delta_1$, $\Delta_1$ indicates the first filtering offset value, and $-1 < \delta < 1$; or when the sign of the difference obtained by subtracting the prediction value of a filtered value from the current pixel value is opposite to the sign of the first filtering offset value $\Delta_1$, using a value obtained by adding the first filtering offset value to the current pixel value, as the actual filtered value.

9. The deblocking filter according to claim 8, wherein the operations include:

computing an absolute value of a difference obtained by subtracting a sum of the prediction value of a filtered value and the current pixel value from the first filtering offset value, to obtain a first absolute value;

computing an absolute value of a difference obtained by subtracting the prediction value of a filtered value from the current pixel value, to obtain a second absolute value;

computing the first absolute value with the second absolute value; and determining the actual filtered value according to a comparison result.

10. The deblocking filter according to claim 9, wherein the operations include:

when the first absolute value is greater than the second absolute value, using a value obtained by adding a second filtering offset value $\Delta_2$ to the current pixel value, as the actual filtered value, wherein $\Delta_2 = \delta \Delta_1$, $\Delta_1$ indicates the first filtering offset value, and $-1 < \delta < 1$; or when the first absolute value is less than or equal to the second absolute value, using a value obtained by adding the first filtering offset value to the current pixel value, as the actual filtered value.

11. The deblocking filter according to claim 8, wherein the operations include: performing weighted summation on pixel values of at least two pixels that are in the second neighbouring partition and located on two sides of the to-be-filtered pixel, to obtain the prediction value of a filtered value of the to-be-filtered pixel.

12. The deblocking filter according to claim 11, wherein the operations include: determining the prediction value of a filtered value according to the following:

$$r = \text{round}[(d_1 p_1 + d_2 p_2 + \ldots + d_N p_N)/d_{N+1}],$$

wherein $d_1, d_2, \ldots d_N$, and $d_{N+1}$ are preset parameters, $d_{N+1} = d_1 + d_2 + \ldots + d_N$, $p_1, p_2, \ldots, p_N$ are N pixel values respectively corresponding to N pixels that are in the second neighbouring partition and located on the two sides of the to-be-filtered pixel, and N is an integer greater than or equal to 2.

13. The deblocking filter according to claim 8, wherein the operations include:
   determining a fitted curve, wherein the fitted curve comprises fitted parameters;
   fitting at least two pixels in the second neighbouring partition according to the fitted curve to obtain values of the fitted parameters; and
   obtaining the prediction value of a filtered value of the to-be-filtered pixel according to the values of the fitted parameters and the fitted curve.

14. The deblocking filter according to claim 8, wherein the operations include: performing weighted summation on the current pixel value of the to-be-filtered pixel and a pixel value of at least one pixel in the first neighbouring partition to obtain the filtering offset value of the to-be-filtered pixel.

15. The deblocking filter according to claim 8, wherein the first neighbouring partition and the second neighbouring partition are the same.

16. A deblocking filtering method comprising:
   determining, according to a current pixel value of a to-be-filtered pixel in a picture block and pixel values of pixels in a first neighbouring partition of the to-be-filtered pixel, a first filtering offset value of the to-be-filtered pixel;
   performing prediction on the current pixel value of the to-be-filtered pixel according to pixel values of pixels in a second neighbouring partition of the to-be-filtered pixel to obtain a prediction value of a filtered value of the to-be-filtered pixel; and
   determining an actual filtered value of the to-be-filtered pixel according to the current pixel value, the first filtering offset value, and the prediction value of a filtered value, wherein the determining the actual filtered value comprises:
   computing an absolute value of a difference obtained by subtracting a sum of the prediction value of a filtered value and the current pixel value from the first filtering offset value, to obtain a first absolute value;
   computing an absolute value of a difference obtained by subtracting the prediction value of a filtered value from the current pixel value, to obtain a second absolute value;
   comparing the first absolute value with the second absolute value;
   determining the actual filtered value according to a comparison result; and
   when the first absolute value is greater than the second absolute value, using a value obtained by adding a second filtering offset value $\Delta_2$ to the current pixel value, as the actual filtered value, wherein $\Delta_2 = \delta \Delta_1$, $\Delta_1$ indicates the first filtering offset value, and $-1 < \delta < 1$; or
   when the first absolute value is less than or equal to the second absolute value, using a value obtained by adding the first filtering offset value to the current pixel value, as the actual filtered value.

17. The method according to claim 4, wherein the performing the weighted summation on pixel values of at least two pixels that are in the second neighbouring partition and located on two sides of the to-be-filtered pixel, to obtain the prediction value of a filtered value of the to-be-filtered pixel comprises:
   determining the prediction value of a filtered value according to the following:

$$r = \text{round}[(d_1 p_1 + d_2 p_2 + \ldots + d_N p_N)/d_{N+1}],$$

wherein $d_1, d_2, \ldots, d_N$ and $d_{N+1}$ are preset parameters, $d_{N+1} = d_1 + d_2 + \ldots + d_N$, $p_1, p_2, \ldots, p_N$ are N pixel values respectively corresponding to N pixels that are in the second neighbouring partition and located on the two sides of the to-be-filtered pixel, and N is an integer greater than or equal to 2.

\* \* \* \* \*